Dec. 25, 1928.
F. L. BANE
1,696,832
COMBINED MEASURING AND DRAFTING INSTRUMENT
Filed Aug. 8, 1925  2 Sheets-Sheet 1
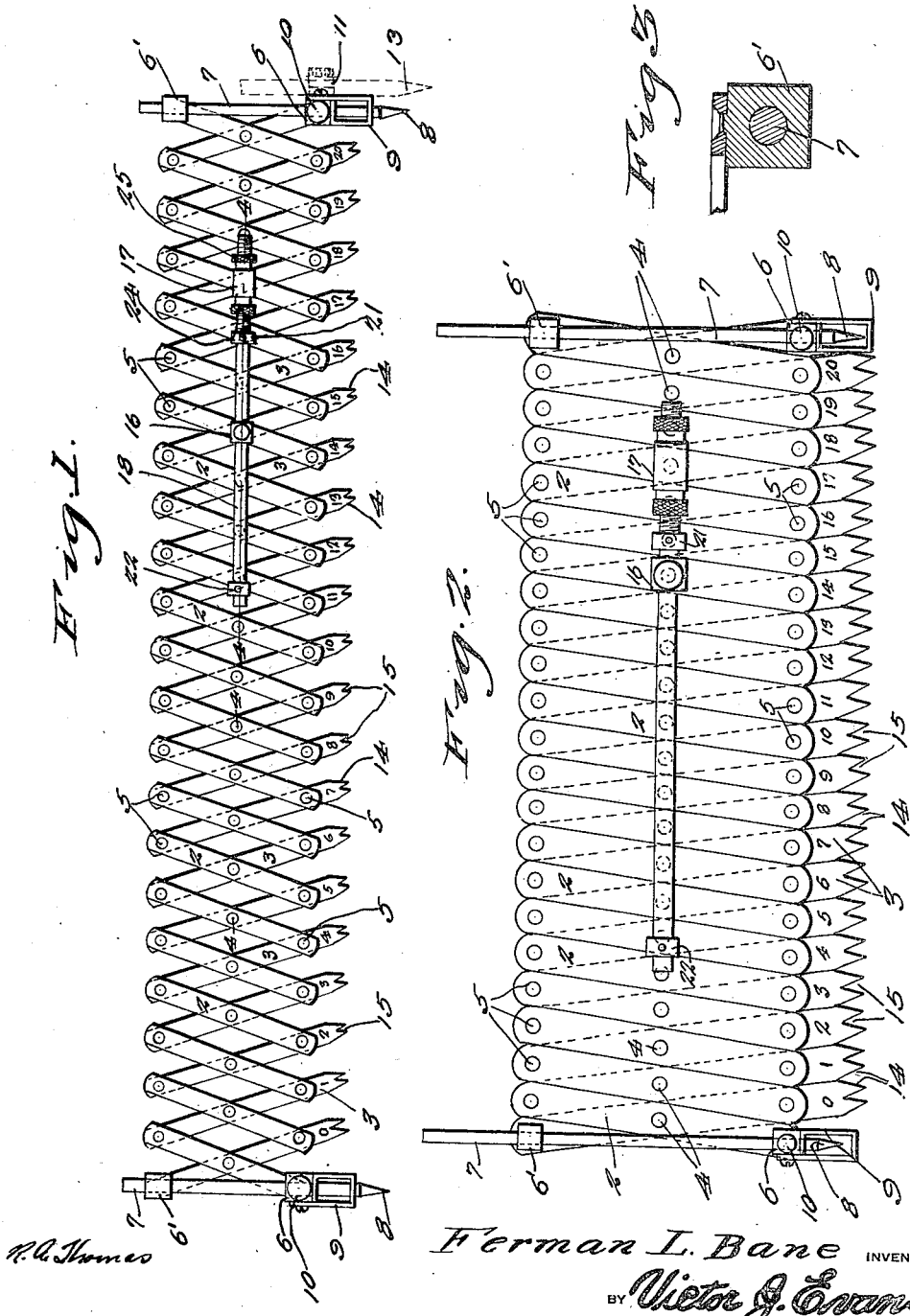
Ferman L. Bane INVENTOR Dec. 25, 1928.　　　　　　　　　　　　　　　1,696,832
F. L. BANE
COMBINED MEASURING AND DRAFTING INSTRUMENT
Filed Aug. 8, 1925　　　2 Sheets-Sheet 2
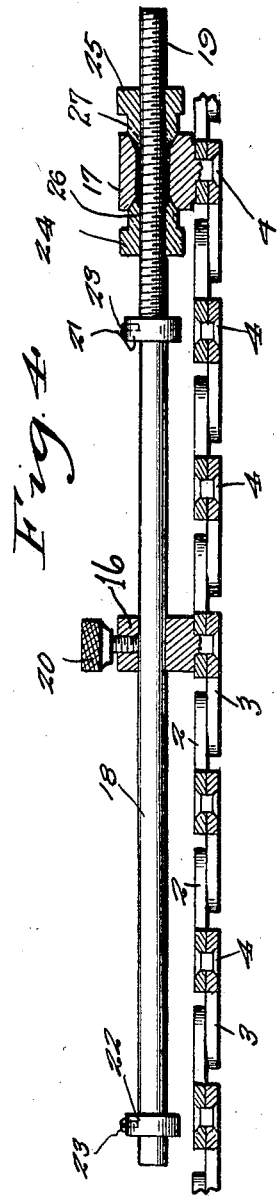
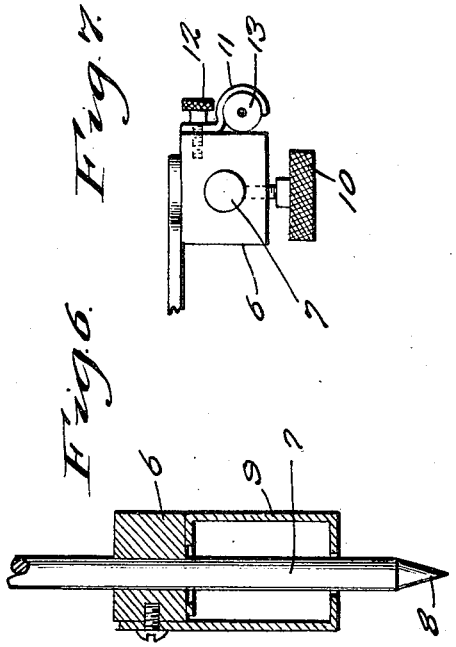
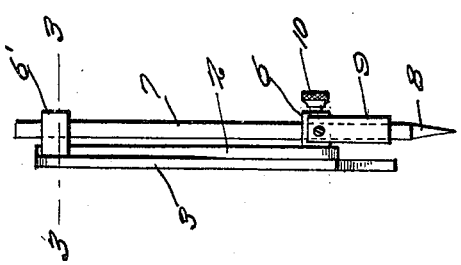
Ferman L. Bane INVENTOR
BY Victor J. Evans
ATTORNEY
WITNESS:

Patented Dec. 25, 1928.

1,696,832

UNITED STATES PATENT OFFICE.

FERMAN L. BANE, OF CINCINNATI, OHIO.

COMBINED MEASURING AND DRAFTING INSTRUMENT.

Application filed August 8, 1925. Serial No. 49,051.

My present invention has reference to a combined measuring and drafting instrument.

An object is the provision of an instrument of this character whereby a body may be divided into a desired number of equidistantly arranged spaces in a single operation and also wherein the instrument may be successfully employed as an ordinary or as a beam compass.

A further object is the provision of an instrument especially adaptable for laying out geometrical lines for drafting sheet metal patterns, spacing holes for rivets in sheet metal, obtaining the girth length of sheet metal patterns prior to the rolling of the same into pipes, and for other general layout work and in which a lazy-tongs system is employed, the same having adjustably secured to its end points, while the adjacent arms of each pair of levers comprising the system are projected beyond the remaining arms and have their ends formed with two substantially V-shaped points, whereby either of the points, or the center between the points may be employed for obtaining desired measurement of spaces and also wherein means is provided for minutely adjusting the levers constituting the system for insuring accuracy in obtaining measurements, and further wherein all of the measurements are obtained at a single operation, thus resulting in the material saving of time and labor.

A still further object is the provision of an instrument of this character having points at the ends of a lazy-tongs system that constitutes the instrument proper and wherein the said points are normally housed in suitable guards for preventing injury thereby to the user of the instrument.

With the above broadly stated objects in view and others which will present themselves as the nature of the invention is better understood, reference is to be had to the drawings which accompany and form part of this application.

In the drawings:—

Figure 1 is a side elevation of an instrument in accordance with this invention.

Figure 2 is a similar view but showing the lazy-tongs system constituting the body of the system folded.

Figure 3 is a sectional view on the line 3—3 of Figure 5.

Figure 4 is a sectional view, on an enlarged scale, and taken approximately on the line 4—4 of Figure 1.

Figure 5 is an end view of the improvement.

Figure 6 is a sectional view through the guard for one of the points.

Figure 7 is a fragmentary plan view looking toward one end of the improvement to disclose the manner in which a pencil or scriber may be removably attached thereto.

The body of the improvement is in the nature of a lazy-tongs system, the levers constituting the same being flat and of determined widths and thicknesses. For distinction the series of levers on one side of the body are indicated by the numerals 2 and those on the opposite side by the numeral 3. The pairs of cross levers 2 and 3 are centrally pivoted, as at 4, and the said levers adjacent to their ends are likewise pivoted, as at 5. Each of the end levers 2 and 3 are pivotally secured to blocks 6 and 6', respectively. These blocks each have an aligning opening and through these openings there is passed a rod 7 that has one of its ends pointed, as at 8. For convenience the rods 7 will hereinafter be referred to as the points of the instrument. The pointed ends 8 of the members 7 are received in substantially rectangular guards or housings 9 that are preferably constructed of a single piece of suitable metal, the outer elements of which being extended and secured to the lower blocks 6. The blocks 6 have threaded openings that communicate with the bore through which the members 7 pass and in these openings there are threaded thumb screws 10. By this arrangement the points may be retained in the housing or projected through an opening in the lower wall of the said housing.

One of the lower blocks 6 has secured thereon the straight end of a rounded spring clip 11. The securing element 12 for the clip 11 is preferably adjustably associated with the block and the said clip is designed to receive therethrough and to bind against the outer face of the block 6 a pencil or scriber instrument 13. When the improvement is employed as a compass the scriber instrument 13 is not employed.

The levers 3 have their ends projected beyond the lower pivots 5 and their said ends have their edges inclined inwardly, as at 14. The ends proper are centrally formed with V-shaped notches 15. Thus the lower end of each of the levers 3 is formed with two substantially V-shaped points. Each lever, in a line with the center of the notches 15 has inscribed thereon a numeral. In the showing of the drawings twenty-one levers are employed and the numerals thereon are arranged consecutively from 0 to 20. Formed integrally with the pivots 4 of two of the levers, or having such pivots fixed thereon are blocks 16 and 17, respectively. These blocks have aligning openings therethrough, while the opening of the block 17 is provided with countersunk ends, and through these openings there is passed a rod 18. The bar has one end threaded, as at 19, and this threaded end is passed through the block 17. The block 16 has a threaded opening communicating with the opening through which the bar passes, and screwed in this opening is the shank of a thumb screw 20. On the bar 18, at the portion thereof between the blocks 16 and 17, there is adjustably secured a collar 21, and adjustably secured on the rod, adjacent to the non-threaded end thereof, there is a second collar 22. This collar is also adjustable, the elements holding the collars on the rod being preferably screws 23.

Screwed on the threaded end 19 of the rod 18 there are lock nuts 24 and 25, the same contacting respectively with the opposite faces of the block 17. The nuts 24 and 25 have their confronting ends provided with bosses 26 and 27, respectively, the ends of which are tapered. These tapered ends are received in the countersinks in the ends of the block 17. The bore in block 17 is of a size to freely receive the threaded end 19 of the rod 18 therethrough. By this arrangement friction between the block and the rod is overcome and the nuts 24 and 25 may be nicely regulated for the minute adjustment of the instrument.

When the toggle lever system is in fully extended position the collar 22 will be brought against the block 16, while the collar 21, contacts with the opposite side of the block 16 when the system is wholly or partly collapsed. Of course, by adjusting the collars the system may be opened or closed to obtain desired distances between the spaces desired on the material. A minute adjustment for measurements is obtained by adjusting the lock nuts 24 and 25.

It is to be noted that the levers 3 are twenty-one in number, and are numbered consecutively from 0 to 20. The V-shaped notches in the outer or lower ends of these levers are employed for spacing and laying out or locating holes for rivets in sheet metal work, and also for locating spaces or lines for drafting sheet metal patterns or any other work required to be equally spaced. After laying out the instrument across the sheet to be spaced into a number of equal spaces, a pencil or scribed is employed, after, of course, the instrument has been stretched to the desired space. The pencil or scriber is placed in the notch in the lever bearing the character 0 and in the notches of the remaining levers required in the spacing operation, and the distance between the scribed marks between the levers numbered 0 and 1 is one space, the distance between the levers numbered 1 and 2 is two spaces, the distance between the levers numbered 2 and 3 is three spaces and so on, so that it will be seen that twenty equidistantly marked spaces may be thus arranged upon the plate or sheet. When the instrument is closed there are twice as many notches presented by the levers 3 as when the instrument is open, the angle walls or inclined edges of the levers providing the additional notches and the distance between all the notches is the same.

When the device is employed as a compass the point adjacent to the scriber 13 is moved into its guard housing, and the opposite point is employed as a pivot. Circles of any desired size may be made by the improvement. The improvement is especially but not necessarily designed for employment for laying out sheet metal patterns, spacing holes for rivets and general layout work of this character.

Having described the invention, I claim:—

In an instrument of the character described, a lazy tongs construction comprising pairs of cross levers pivotally connected between their ends and centrally of one of the levers of each pair, one end of each lever of a pair being pivotally connected to that of a lever of an adjacent pair, the other end of one of the levers of each pair being pivotally connected to a lever of an adjacent pair at a point between its central pivotal point and its end, the extending portion of said lever being centrally notched and having its side edges converging and forming with said notch, points on said extending end, upper and lower blocks at each end of said lazy tongs construction having aligned apertures therein, pointed members extending through said apertures, set screws for holding said pointed members in said blocks, other blocks pivotally connected centrally to certain of said levers and in spaced relation to each other, said other blocks having aligned apertures and a rod extending therethrough and connected with one of the lugs by a set screw, lock nuts threadedly connected with the rod on either side of the other lug.

In testimony whereof I affix my signature.

FERMAN L. BANE.